United States Patent
MacInnis

(10) Patent No.: US 9,692,537 B2
(45) Date of Patent: Jun. 27, 2017

(54) SYSTEM, METHOD, AND APPARATUS FOR JITTER REDUCTION IN A VIDEO DECODER SYSTEM

(75) Inventor: Alexander MacInnis, Ann Arbor, MI (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 541 days.

(21) Appl. No.: 11/550,776

(22) Filed: Oct. 18, 2006

(65) Prior Publication Data

US 2007/0086344 A1    Apr. 19, 2007

Related U.S. Application Data

(60) Provisional application No. 60/727,733, filed on Oct. 18, 2005.

(51) Int. Cl.
| | |
|---|---|
| *H04J 3/06* | (2006.01) |
| *H04N 21/2368* | (2011.01) |
| *H04N 21/43* | (2011.01) |
| *H04N 21/434* | (2011.01) |

(52) U.S. Cl.
CPC ........ *H04J 3/0632* (2013.01); *H04N 21/2368* (2013.01); *H04N 21/4305* (2013.01); *H04N 21/4341* (2013.01)

(58) Field of Classification Search
CPC ............. H04N 9/8063; H04N 21/2368; H04N 21/4307; H04N 21/4341; H04N 21/8547
USPC .................................................. 370/516–519
See application file for complete search history.

(56) References Cited

U.S. PATENT DOCUMENTS

| | | | | |
|---|---|---|---|---|
| 5,396,497 | A * | 3/1995 | Veltman .................. | 375/240.25 |
| 5,543,853 | A * | 8/1996 | Haskell ................ | H04J 3/0626 |
| | | | | 348/466 |
| 5,790,543 | A * | 8/1998 | Cloutier ............ | H04N 21/4305 |
| | | | | 370/252 |
| 6,044,396 | A * | 3/2000 | Adams ........................... | 725/95 |
| 6,122,668 | A * | 9/2000 | Teng et al. .................... | 709/231 |
| 6,744,815 | B1 * | 6/2004 | Sackstein et al. ............ | 375/240 |
| 7,447,419 | B2 * | 11/2008 | Kuroiwa et al. ................ | 386/96 |
| 7,545,794 | B2 * | 6/2009 | Loukianov .................... | 370/350 |
| 2004/0073949 | A1 * | 4/2004 | Chen .................. | H04N 7/17309 |
| | | | | 725/135 |
| 2005/0021811 | A1 * | 1/2005 | Roelens ............. | H04N 21/4307 |
| | | | | 709/231 |
| 2005/0114909 | A1 * | 5/2005 | Mercier ........... | G11B 20/00086 |
| | | | | 725/141 |
| 2005/0259694 | A1 * | 11/2005 | Garudadri ............... | H04L 29/06 |
| | | | | 370/503 |
| 2005/0281255 | A1 * | 12/2005 | Davies et al. ................ | 370/389 |
| 2006/0012709 | A1 * | 1/2006 | Yamada et al. ............... | 348/515 |
| 2006/0013263 | A1 * | 1/2006 | Fellman ................ | H04J 3/0638 |
| | | | | 370/503 |
| 2006/0062550 | A1 * | 3/2006 | Lee .......................... | H04N 5/76 |
| | | | | 386/296 |

(Continued)

*Primary Examiner* — Benjamin Lamont
(74) *Attorney, Agent, or Firm* — Foley & Lardner LLP

(57) ABSTRACT

In one embodiment, there is presented a method for processing data. The method comprises receiving a bitstream, said bitstream comprising a first data stream and a second data stream, wherein the first data stream comprises data that is intended to be consumed at a substantially constant bit rate; and controlling the processing rate of the second data stream based at least in part on the rate of receipt of the first data stream.

14 Claims, 4 Drawing Sheets

(56) References Cited

U.S. PATENT DOCUMENTS

2006/0103760 A1\* 5/2006 Johnson ............ H04N 21/4341
348/515
2008/0250101 A1\* 10/2008 Tanaka et al. ................ 709/203

\* cited by examiner

SYSTEM, METHOD, AND APPARATUS FOR JITTER REDUCTION IN A VIDEO DECODER SYSTEM

RELATED APPLICATIONS

This application claims priority to "System, Method, and Apparatus for Reducing Jitter Reduction in a Video Decoder System", Provisional Application for Patent Ser. No. 60/727,733, filed Oct. 18, 2005, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Packet based networks can be jittery with variable amounts of transmission delay. Many video decoders can tolerate only up to a certain amount of jitter. If the jitter exceeds the tolerances, data can be lost or not available for decoding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in system(s), method(s), and apparatus for jitter reduction, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF PREFERRED EMBODIMENTS

Figure 1:
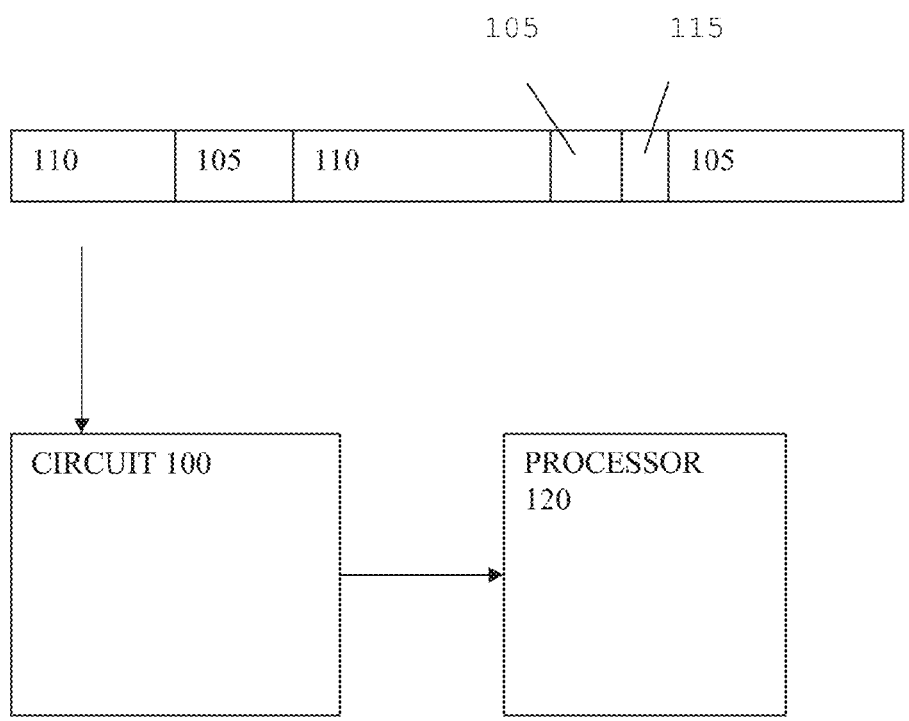
FIG. 1 is a block diagram of an exemplary circuit for processing data.

Referring now to FIG. 1, there is an illustration describing the processing of data in accordance with an embodiment of the present invention. Circuit 100 receives a bitstream 105. The bitstream 105 includes a first data stream 110 and a second data stream 115.

In certain embodiments of the present invention, the bitstream 105 can include any number of data streams, such as first data stream 110 and second data stream 115 that are multiplexed together. The bitstream 105 can include packets, such as transport packets that carrying the different data streams in the payload.

It is noted that the delivery and the receipt of the bitstream 105 can have varied delays. The variable delays can be due to a variety of factors. For example, where the bitstream 105 is received from a network, the variable delays can be due to network jitter.

The first data stream 110 includes data that is to be consumed at a relatively constant bit rate. For example, the first data stream 110 can include data for a real-time application, wherein the real-time application consumes the data at a relatively constant bit rate. The second data stream 115 can include data that is to be consumed at either a relatively constant bit rate or a variable bit rate.

The circuit 100 controls the processing of the second data stream 115 by a processor 120 based on the rate of receipt of the first data stream 110. The circuit 100 can control the processing of the second data stream 115 by the processor 120 in a variety of ways.

In certain embodiments of the present invention, the circuit 100 can write the first data stream to a buffer and control the processing rate of the second data stream based on the amount of data from the first data stream in the buffer.

In other embodiments, the first data stream and the second data stream can be commingled. Portions of the first data stream and portions of the second data stream can be interspersed throughout the bitstream. The circuit 100 can provide data from the first data stream for processing by the processor 120 at a certain rate, such as the constant rate that the first data stream is to be consumed. Thus, in a certain time period, the circuit 100 provides a given amount of the first data stream for processing. The circuit 100 can provide the portion of the second data stream that is commingled with the given amount of the first data stream for processing during the certain time period.

Figure 2:
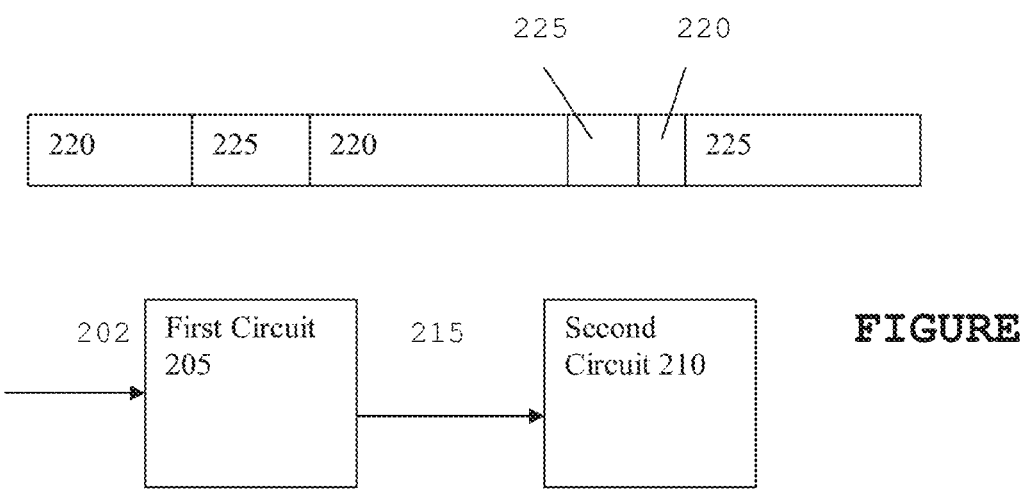
FIG. 2 is a block diagram of another circuit in accordance with an embodiment of the present invention.

Referring now to FIG. 2, there is illustrated another circuit 200 for providing data from a bitstream in accordance with an embodiment of the present invention. The circuit comprises a first circuit 205 and a second circuit 210. The bitstream 202 includes time stamps that indicative of the time base associated with the bitstream 202.

The first circuit 205 reduces jitter in the bitstream that is due to the variable delay in the delivery of the bitstream. This results in a bitstream 215 with another delivery schedule. The second circuit 210 recovers the time base associated with the bitstream 215, based at least in part on the time stamps in the bitstream 215, with the another delivery schedule.

In certain embodiments of the present invention, the bitstream 215 comprises a first data stream 220 and a second data stream 225. The first circuit 205 comprises a buffer. The buffer stores the first data stream 220. The first circuit 205 controls the processing rate of the second data stream 225 by controlling the delivery of the second data stream 225 based at least in part on the fullness of the buffer.

In other embodiments, the first data stream 220 and the second data stream 225 can be commingled. In a certain time period, the first circuit 205 provides a given amount of the first data stream 220 for processing. The first circuit 205 can provide the portion of the second data stream 225 that is commingled with the given amount of the first data stream for processing during a certain time period.

In certain embodiments of the present invention, the circuit can also include a system time clock and a comparator. The system time clock provides a time base. The comparator compares the system time clock and the time stamps. Based at least in part on the comparison, the second circuit 210 adjusts the system time clock.

The present invention can be used in a variety of contexts. Certain embodiments of the present invention can be used with compressed audio and video data.

Figure 3:
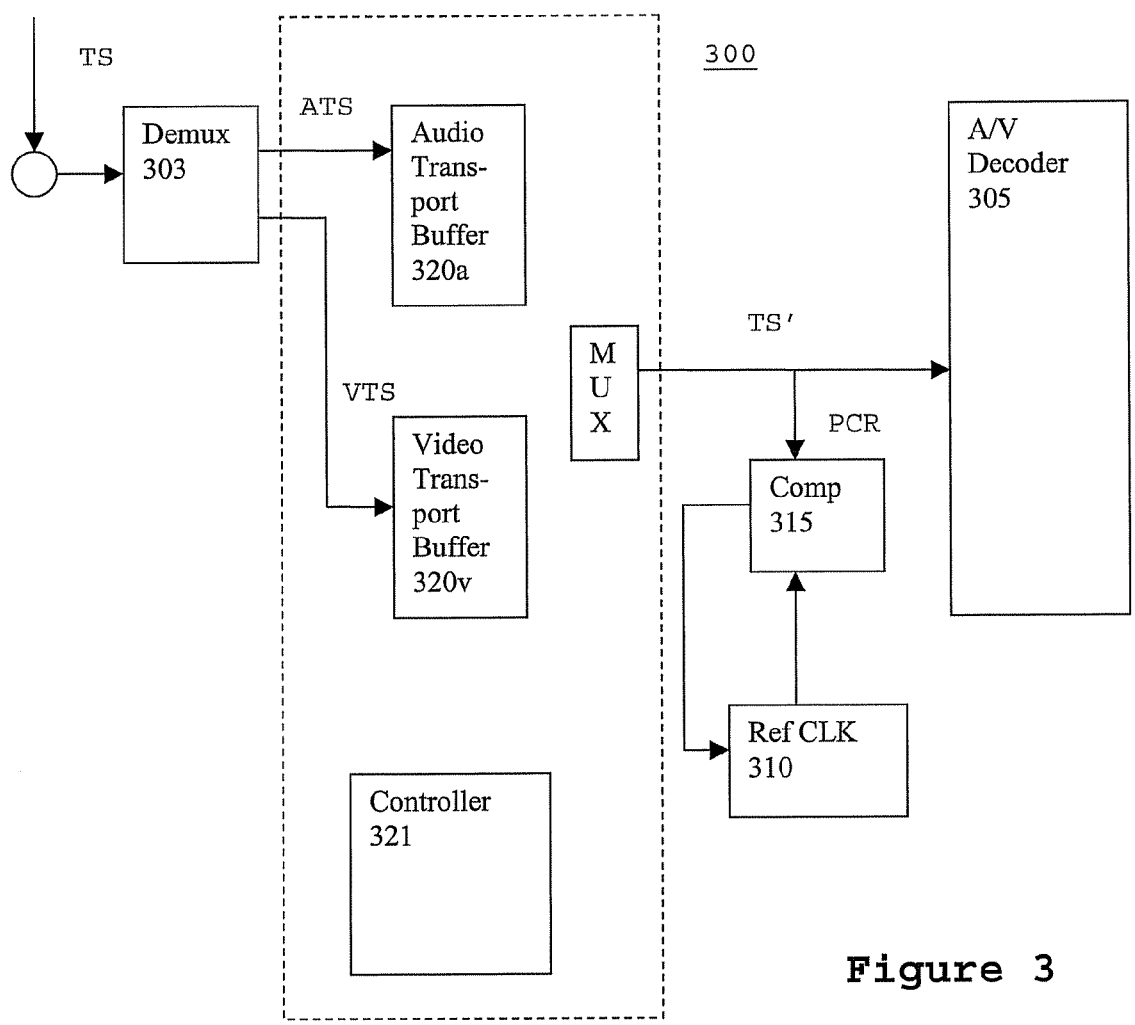
FIG. 3 is a block diagram of a decoder in accordance with an embodiment of the present invention.

Referring now to FIG. 3, there is illustrated a block diagram of an exemplary decoder 300 for processing data in accordance with an embodiment of the present invention. The decoder 300 comprises an input for receiving a transport stream TS. The transport stream TS comprises transport packets carrying portions of audio and video elementary streams.

The circuit 300 comprises a demultiplexer 303 for separating the transport packets carrying portions of audio elementary streams AS from the transport packets carrying portions of the video elementary streams, (video stream), VS. An audio buffer 320a stores the transport packets carrying portions of audio elementary streams, (audio stream) ATS. The video buffer 320v stores the transport packets carrying portions of video elementary streams VS.

In many compression standards, such as MPEG-1 or MPEG-2, compressed audio data is intended to be consumed at a relatively constant rate. However, video data may be intended to be consumed at a variable bit rate. The controller 321 is operable to provide the audio stream ATS and video stream VTS from the audio transport buffer 320a and video transport buffer 320v, based on the fullness of the audio buffer, to the A/V decoder 305.

For example, in the original transport stream TS, the audio stream AS and the video stream VS are commingled. During a time period, a certain amount of the audio stream AS and the portions of the video stream VS commingled therebetween can be delivered to the A/V decoder The foregoing results in a transport stream TS' with a different delivery schedule from the original transport stream TS. The jitter in transport stream TS that is due to variable delivery delay is reduced in the transport stream TS'.

The comparator 315 compares the PCRs of the transport stream TS' to the time base provided by the system time clock 310. Based on the comparison, the comparator adjusts the system time clock 310.

Figure 4:
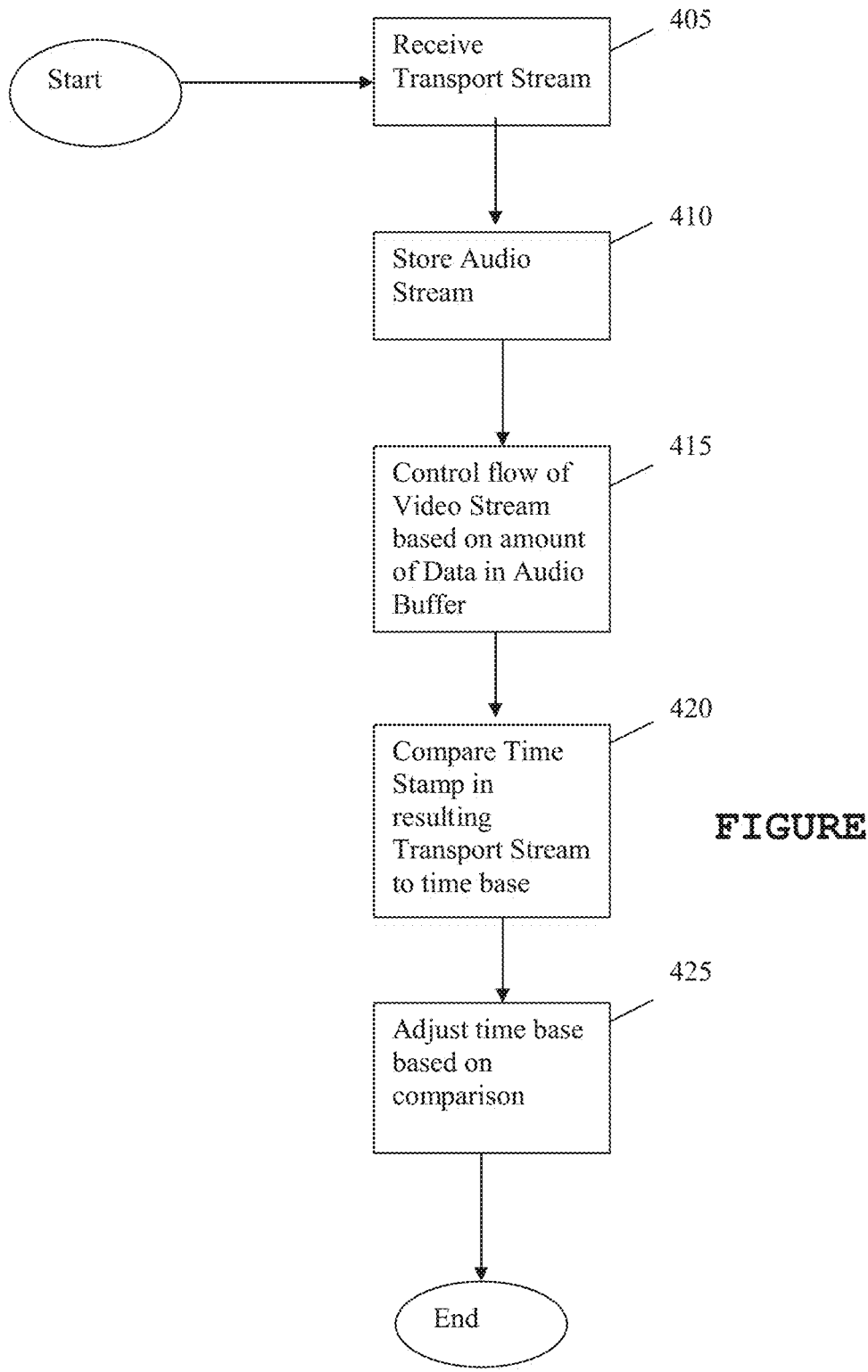
FIG. 4 is a flow diagram for processing video data in accordance with an embodiment of the present invention.

Referring now to FIG. 4, there is illustrated a flow diagram for processing data in accordance with an embodiment of the present invention. At 405, an input receives a transport stream TS. The transport stream TS comprises an audio stream and a video stream. The audio stream comprises data that is intended to be consumed by the A/V decoder 305 at a substantially constant bit rate while the video stream comprises data that is intended to be consumed by the A/V decoder 305 at a varying bit rate.

At 410, the audio buffer 320a stores the audio stream ATS. At 415, the controller 321 controls the flow of the video stream VTS to the A/V decoder 305 based on the amount of data from the audio stream in the audio buffer 320a. The foregoing results in transport stream TS' with a different delivery schedule.

At 420, the comparator compares time stamps in transport stream TS' to the system time clock. Based on the comparison of the times stamps to the system time clock, the comparator adjusts the system time clock at 425.

Figure 5:
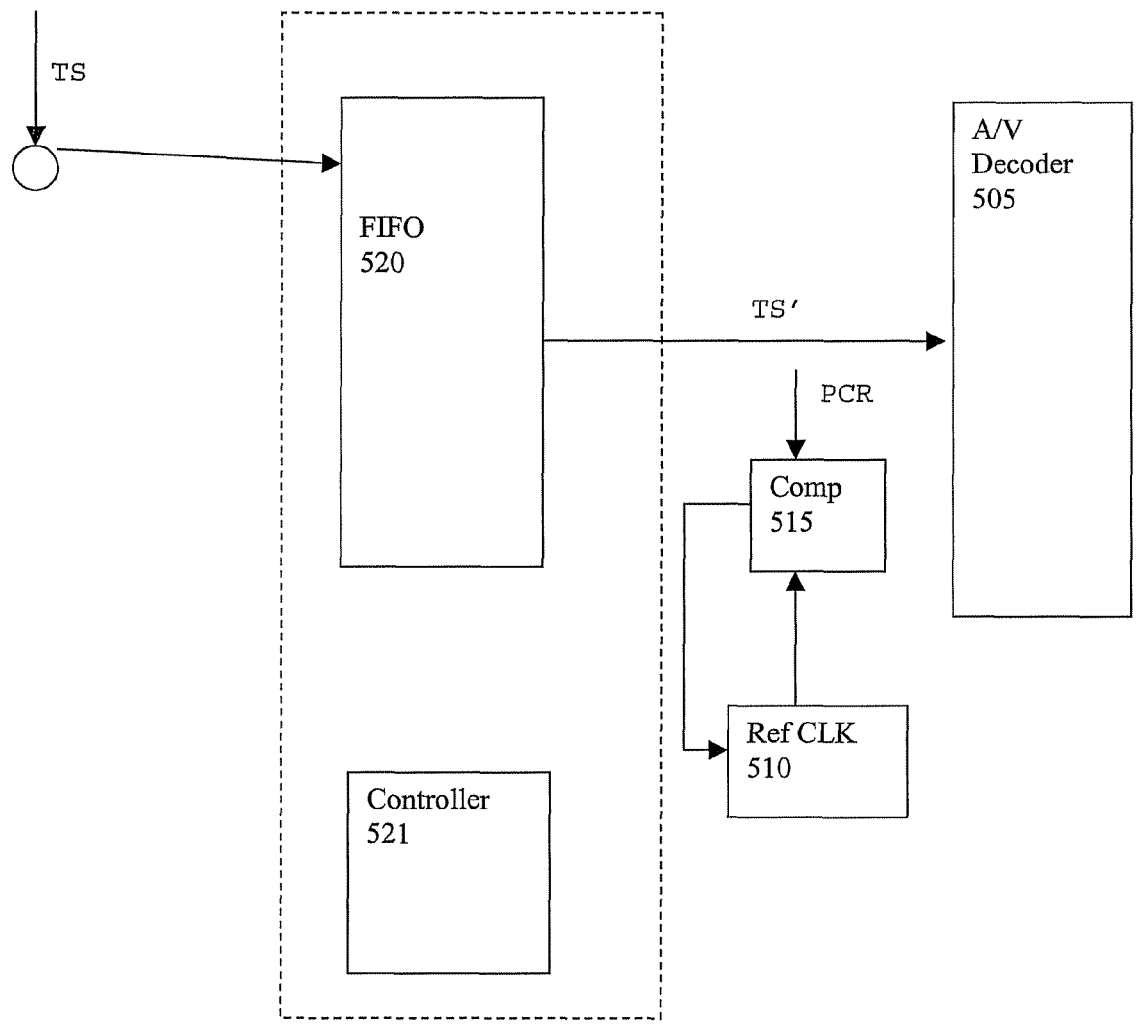
FIG. 5 is a block diagram of another decoder in accordance with an embodiment of the present invention.

Referring now to FIG. 5, there is illustrated a block diagram of an exemplary decoder 500 for processing data in accordance with an embodiment of the present invention. The decoder 500 comprises an input for receiving a transport stream TS. The transport stream TS comprises transport packets carrying portions of audio and video elementary streams.

The circuit 500 comprises a FIFO 520 for storing the transport stream TS. A controller 523 controls the rate of data provided to the A/V decoder 505, based on the amount of audio data in the FIFO 520.

The foregoing results in a transport stream TS' with a different delivery schedule from the original transport stream TS. The jitter in transport stream TS that is due to variable delivery delay is reduced in the transport stream TS'.

The comparator 515 compares the PCRs of the transport stream TS' to the time base provided by the system time clock 510. Based on the comparison, the comparator adjusts the system time clock 510.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as instructions in firmware.

The degree of integration may primarily be determined by speed and cost considerations. Because of the sophisticated nature of modern processors, it is possible to utilize a commercially available processor, which may be implemented external to an ASIC implementation.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for processing data, said method comprising:
receiving, by processing circuitry, a first transport stream comprising a first elementary stream and a second elementary stream, wherein the first elementary stream comprises first data, wherein a substantially constant number of bits of the first data are to be consumed per unit time, and wherein the second elementary stream comprises second data, wherein a varying number of bits of the second data are to be consumed per unit time, the first transport stream associated with a first delivery schedule for delivering the first transport stream to a decoder;
storing, by the processing circuitry, at least the first elementary stream in a buffer;
determining, by the processing circuitry, a second delivery schedule that is different from the first delivery schedule by:
controlling the processing rate of the second elementary stream based on a rate of receipt of the first elementary stream; and reducing jitter in the first transport stream due to variable delay in delivery of the first transport stream to the processing circuitry;

generating, by the processing circuitry, a second transport stream using the second delivery schedule, the second transport stream comprising the first elementary stream and the second elementary stream and associated with the second delivery schedule;

delivering the second transport stream to the decoder according to the second delivery schedule; and adjusting, by the processing circuitry, a time base provided by a system time clock based at least in part on time stamps of the second transport stream, the time base provided by the system clock configured to control processing of both the first elementary stream and the second elementary stream of the second transport stream.

2. The method of claim 1, wherein the first data and the second data are compressed data.

3. The method of claim 1, wherein the first elementary stream comprises an audio stream and the second elementary stream comprises a video stream.

4. The method of claim 1, wherein adjusting the time base provided by the system clock based on the amount of the first elementary stream stored in the buffer comprises adjusting the time base based on a comparison of the time base to time stamps in the second transport stream, the time stamps indicative of a second time base associated with the second transport stream.

5. The method of claim 4, wherein the time stamps comprise program clock reference data in the second transport stream.

6. A method for processing data, said method comprising:

receiving, by processing circuitry, a first transport stream comprising an audio elementary stream and a video elementary stream, wherein the audio elementary stream comprises audio data, wherein a substantially constant number of bits of the audio data are to be consumed per unit time and the video elementary stream comprises video data, wherein a varying number of bits of the video data are to be consumed per unit time, the first transport stream associated with a first delivery schedule for delivering the first transport stream to a decoder;

storing, by the processing circuitry, at least the audio elementary stream in a buffer;

determining, by the processing circuitry, a second delivery schedule that is different from the first delivery schedule by:
  controlling the processing rate of the video elementary stream based on a rate of receipt of the audio elementary stream; and
  reducing jitter in the first transport stream due to variable delay in delivery of the first transport stream to the processing circuitry;

generating, by the processing circuitry, a second transport stream using the second delivery schedule, the second transport stream comprising the audio elementary stream and the video elementary stream and associated with the second delivery schedule;

delivering the second transport stream to the decoder according to the second delivery schedule; and adjusting, by the processing circuitry, a time base provided by a system time clock based at least in part on time stamps of the second transport stream, the time base provided by the system clock configured to control processing of both the audio elementary stream and the video elementary stream of the second transport stream.

7. The method of claim 6, wherein at least one of the audio elementary stream or the video elementary stream is compressed.

8. The method of claim 6, wherein adjusting the time base provided by the system clock based on the amount of the audio elementary stream stored in the buffer comprises adjusting the time base based on a comparison of the time base to time stamps in second transport stream, the time stamps indicative of a second time base associated with the second transport stream.

9. The method of claim 8, wherein the time stamps comprise program clock reference data in the second transport stream.

10. A circuit for providing data from a bitstream, said circuit comprising:

a buffer;

a system time clock providing a time base for the circuit;

a first circuit configured to reduce jitter in the bitstream due to variable delay in the delivery of the bitstream, the bitstream comprising a first elementary stream comprising first data and a second elementary stream comprising second data, wherein a substantially constant number of bits of the first data are to be consumed per unit time, and wherein a varying number of bits of the second data are to be consumed per unit time, the bitstream associated with a first delivery schedule for delivering the bitstream to a decoder, the first circuit configured to:
  store the first elementary stream in the buffer;
  determine a second delivery schedule before delivering the bitstream to the decoder that is different from the first delivery schedule by:
    controlling a processing rate of the second elementary stream based on a rate of receipt of the first elementary stream and an amount of the first elementary stream stored in the buffer; and
    reducing the jitter in the bitstream;
  generating a modified bitstream by modifying the bitstream using the second delivery schedule, the modified bitstream comprising the first elementary stream and the second elementary stream and associated with the second delivery schedule;

a second circuit configured to adjust the time base provided by the system clock based at least in part on time stamps of the modified bitstream and the amount of the first elementary stream stored in the buffer; and an audio-video decoder circuit configured to obtain the adjusted time base from the system time clock, receive the modified bitstream according to the second delivery schedule, and process both the first elementary stream and the second elementary stream based on the adjusted time base.

11. The circuit of claim 10, wherein the first elementary stream comprises an audio stream, and the second elementary stream comprises a video stream.

12. The circuit of claim 10, wherein at least one of the first elementary stream and the second elementary stream are compressed.

13. The method of claim 10, the second circuit configured to adjust the time base provided by the system clock based on the amount of the first elementary stream stored in the buffer by adjusting the time base based on a comparison of the time base to time stamps in the modified bitstream, the time stamps indicative of a second time base associated with the modified bitstream.

14. The method of claim 13, wherein the time stamps comprise program clock reference data in the modified bitstream.

\* \* \* \* \*